United States Patent
Al-Rawhani et al.

(10) Patent No.: US 12,520,611 B2
(45) Date of Patent: Jan. 6, 2026

(54) HIGH COUNT RATE PASSIVE QUENCHING SPAD

(71) Applicant: STMicroelectronics (Research & Development) Limited, Marlow (GB)

(72) Inventors: Mohammed Al-Rawhani, Glasgow (GB); Bruce Rae, Edinburgh (GB)

(73) Assignee: STMicroelectronics (Research & Development) Limited, Marlow (GB)

( * ) Notice: Subject to any disclaimer, the term of this patent is extended or adjusted under 35 U.S.C. 154(b) by 573 days.

(21) Appl. No.: 17/975,093

(22) Filed: Oct. 27, 2022

(65) Prior Publication Data
US 2024/0145500 A1 May 2, 2024

(51) Int. Cl.
*H10F 39/00* (2025.01)
*H10F 30/225* (2025.01)
*H10F 39/18* (2025.01)

(52) U.S. Cl.
CPC ....... *H10F 39/8037* (2025.01); *H10F 30/225* (2025.01); *H10F 39/18* (2025.01)

(58) Field of Classification Search
CPC .............. H10F 30/225; H04N 25/773; G01J 2001/442; G01J 2001/4466
See application file for complete search history.

(56) References Cited

U.S. PATENT DOCUMENTS

| | | | |
|---|---|---|---|
| 9,024,246 B2 | 5/2015 | Jiang et al. | |
| 9,568,620 B2 | 2/2017 | Guo et al. | |
| 10,012,534 B2 | 7/2018 | Andreou et al. | |
| 11,031,511 B2 | 6/2021 | Stark | |
| 11,349,042 B2 | 5/2022 | Al-Rawhani et al. | |
| 2014/0191115 A1 | 7/2014 | Webster et al. | |
| 2017/0301816 A1* | 10/2017 | Moore | H10F 30/225 |

(Continued)

FOREIGN PATENT DOCUMENTS

| | | |
|---|---|---|
| CN | 111540790 A | 8/2020 |
| EP | 2130011 B1 | 5/2018 |
| EP | 3591712 A1 | 1/2020 |

OTHER PUBLICATIONS

Dimler SJ et al: "Capacitive Quenching Measurement Circuit for Geiger-Mode Avalanche Photodiodes", IEEE Journal of Selected Topics in Quantum Electronics, IEEE, USA, vol. 13, No. 4, Jul. 1, 2007 (Jul. 1, 2007), pp. 919-925.

(Continued)

*Primary Examiner* — Thanh Luu
(74) *Attorney, Agent, or Firm* — Crowe & Dunlevy LLC

(57) ABSTRACT

An array of single photon avalanche diodes (SPADs) includes a plurality of pixels. Each pixel includes a SPAD having a cathode connected to a first intermediate node and an anode coupled to first negative voltage, a quench circuit connected between the first intermediate node and the low voltage supply node, an AC coupling element connected between the first intermediate node and a second intermediate node, a filter component connected between the high voltage node and the second intermediate node, and an inverter having its input connected to the second intermediate node and its output providing an output signal. A resistance associated with the quench circuit, a capacitance associated with the SPAD, a capacitance associated with the AC coupling element, and a resistance associated with the filter component form a variable second order filter.

25 Claims, 4 Drawing Sheets

(56) References Cited

U.S. PATENT DOCUMENTS

2018/0026147 A1* 1/2018 Zhang .................. H10F 77/959
257/292
2020/0278247 A1* 9/2020 Dutton .................... G01S 7/497

OTHER PUBLICATIONS

EESR for counterpart EP Appl. No. 23203953.7, report dated Feb. 15, 2024, 12 pgs.
Kumagai, Oichi, et al.: "A 189x600 Back-Illuminated Stacked SPAD Direct Time-of-Flight Depth Sensor for Automotive LiDAR Systems," 2021 IEEE International Solid-State Circuits Conference, Session 7, Imagers and Range Sensors, 7.3, 3 pgs.
Severini, Fabio, et al.: "SPAD Pixel With Sub-NS Dead-Time for High-County Rate Applications," IEEE Journal of Selected Topics in Quantum Electronics, vol. 28, No. 2, Mar./Apr. 2022, 8 pgs.
Savuskan, Vitali, et al.: "Selecting Single Photon Avalanche Diode (SPAD) Passive-Quenching Resistance: An Approach," IEEE Sensors Journal, vol. 13, No. 6, Jun. 2013, pp. 2322-2328.

* cited by examiner

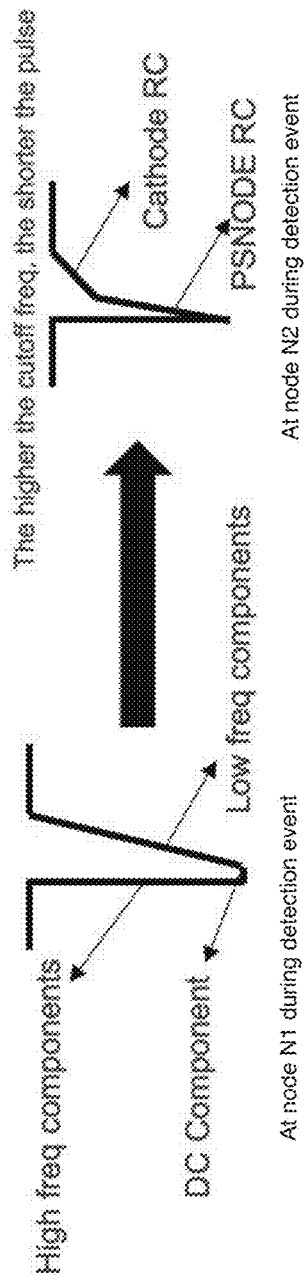
FIG. 3A
FIG. 3B
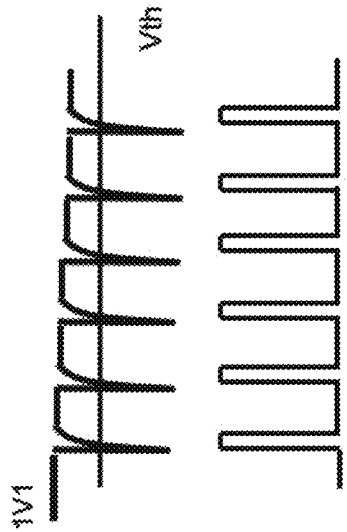
FIG. 4

HIGH COUNT RATE PASSIVE QUENCHING SPAD

TECHNICAL FIELD

This application is directed to passive quenching circuits for single photon avalanche diodes (SPADs) having an increased maximum count rate.

BACKGROUND

Single photon avalanche diode (SPAD) photodetectors are based on a PN junction that is reverse biased at a voltage exceeding a breakdown voltage. When a photon-generated carrier (via the internal photoelectric effect) is injected into the depletion region of the PN junction, a self-sustaining avalanche ensues, and detection of current output as a result of this avalanche can be used to indicate detection of the photon that generated the carrier. This avalanche is stopped by lowering the reverse bias across the SPAD for a short time interval, and it is this time interval that determines the dead time (e.g., the period of time after the detection of a photon where no further detection is possible).

A sample prior art pixel 1 for use in a photodetector is shown in FIG. 1A. The pixel 1 includes a SPAD 2 having its cathode coupled to a voltage supply VEX through a p-channel quench transistor MP and its anode coupled to a negative voltage Vneg. The gate of the quench transistor MP is coupled to receive a quench control signal Vq.

When the quench control signal Vq is set to sufficiently low value such that the quench transistor MP turns on into the linear region of operation to act as a resistor, the cathode of the SPAD 2 is connected to the voltage supply VEX through the source-drain resistance of the quench transistor MP, setting the reverse bias voltage of the SPAD 2 above its breakdown voltage.

When an incoming photon strikes the SPAD 2, the SPAD 2 will avalanche and its cathode voltage will swing between the voltage VEX and the breakdown voltage of the SPAD 2, creating a current pulse that is detected by the inverter 3. The avalanche is quenched by the source-drain resistance of the quench transistor MP, resetting the SPAD 2 for the next detection, with the duration of this reset period setting the dead time. The dead time in turn limits the maximum count rate to $1/eT$, with T being the dead time and e being Euler's constant representing the RC time constant. The maximum count rate (MCR) of a sample SPAD is shown in FIG. 1B, where it can be observed that count rate of the SPAD increases with illumination intensity until it reaches a peak at the MCR, after which time the count rate decays as the SPAD saturates.

Shown in FIG. 1C is how in the photodetector of FIG. 1A, in lower light conditions, the SPAD 2 does not saturate, with individual output pulses OUT being generated at the output of the inverter 3 as the cathode voltage of the SPAD 2 falls below the threshold voltage Vth of the inverter 3 during a detection event and rises back above the threshold voltage Vth of the inverter 3 during quenching. Consider now, however, the higher light conditions in FIG. 1D in which the SPAD 2 saturates, preventing the cathode voltage of the SPAD 2 from rising back above the threshold voltage of the inverter 3 during quenching, therefore causing the missing of individual photo detection events.

This is clearly undesirable, as there are instances in high light environments where the capability of handling a high count rate is desired. One known solution to permit the handling of a high count rate in a high light environment is to use an active reset whereby the SPAD is forced to reset quickly, reducing deadtime. Active reset, however, utilizes complex circuits based upon positive feedback which can lead to instability, which consume a large amount of area, and which may limit quantum efficiency. (See, for example, the solution in Dolatpoor et al., "An Ultrafast Active Quenching Active Reset Circuit with 50% SPAD Afterpulsing Reduction in a 28 nm FD-SOI CMOS Technology Using Body Biasing Technique. Sensors (Basel)," 2021 Jun. 10; 21(12):4014. doi: 10.3390/s21124014. PMID: 34200801; PMCID: PMC8230464—incorporated herein by reference).

Due to these drawbacks of the current approach, it is evident that further development is needed.

SUMMARY

Disclosed herein is an array of single photon avalanche diodes (SPADs) including a plurality of pixels. Each pixel includes: a SPAD having an anode connected to a first intermediate node and an anode coupled to first negative voltage; a quench circuit connected between the first intermediate node and the high voltage node; an AC coupling element connected between the first intermediate node and a second intermediate node; a filter component connected between the high voltage node and the second intermediate node; and an inverter having its input connected to the second intermediate node and its output providing an output signal. A resistance associated with the quench circuit, a capacitance associated with the SPAD, a capacitance associated with the AC coupling element, and a resistance associated with the filter component form a variable second order filter.

The quench circuit may include a p-channel transistor having its source connected to the high voltage node, its drain connected to a first transistor circuit node, and its gate controlled by a quench control signal.

The quench circuit may include a thin/double layer gate oxide p-channel transistor having its source connected to a first transistor circuit node, its drain connected to a second transistor circuit node, and its gate controlled by an enable signal.

The quench circuit may further include an extended drain p-channel transistor having its source connected to a second transistor circuit node, its drain connected to the first intermediate node, and its gate controlled by the cascode control signal.

The filter component may be an extended drain double layer gate oxide p-channel transistor having its source connected to the high voltage node, its drain connected to the second intermediate node, and its gate connected to a high pass filter control signal.

The AC coupling element may be a metal-oxide-metal capacitor.

The quench circuit, AC coupling element, filer circuit, ballast capacitor, and inverter may be integrated within a lower tier chip, and the SPAD may be integrated within a top tier chip, with the top tier chip and lower tier chip in a stacked die arrangement.

A turn-off diode may have its anode connected to a second negative voltage lower than the first negative voltage and its cathode connected to the first intermediate node.

BRIEF DESCRIPTION OF THE DRAWINGS

FIG. 3A is a graph showing the cathode current of the SPAD of FIG. 2 during operation.

FIG. 3B is a graph showing the cathode current of the SPAD of FIG. 2 after high pass filtering during operation.

FIG. 4 is a graph showing the voltage at node N2 after filtering as compared to the output of the output inverter during operation in a high light condition.

DETAILED DESCRIPTION

The following disclosure enables a person skilled in the art to make and use the subject matter disclosed herein. The general principles described herein may be applied to embodiments and applications other than those detailed above without departing from the spirit and scope of this disclosure. This disclosure is not intended to be limited to the embodiments shown, but is to be accorded the widest scope consistent with the principles and features disclosed or suggested herein. Do note that in the below description, any described resistor or resistance is a discrete device unless the contrary is stated, and is not simply an electrical lead between two points. Thus, any described resistor or resistance coupled between two points has a greater resistance than a lead between those two points would have, and such resistor or resistance cannot be interpreted to be a lead. Similarly, any described capacitor or capacitance is a discrete device unless the contrary is stated, and is not a parasitic unless the contrary is stated. Moreover, any described inductor or inductance is a discrete device unless the contrary is stated, and is not a parasitic unless the contrary is stated.

Figure 1A:
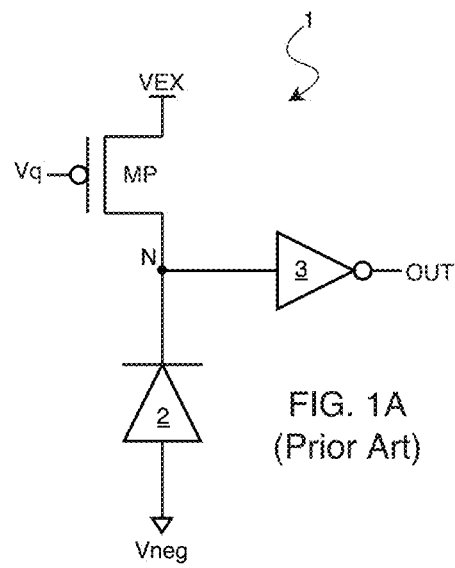
FIG. 1A is a schematic diagram of a known SPAD-based detection pixel.
Figure 1B:
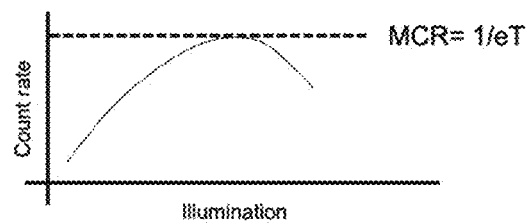
FIG. 1B is a graph showing the relationship between illumination and count rate output by the SPAD of FIG. 1D.
Figure 1C:
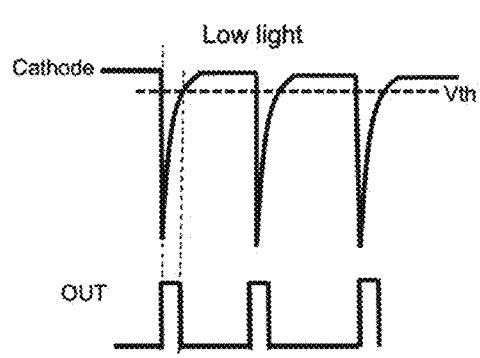
FIG. 1C is a graph showing the cathode voltage of the pixel of FIG. 1A during operation in low light conditions.
Figure 1D:
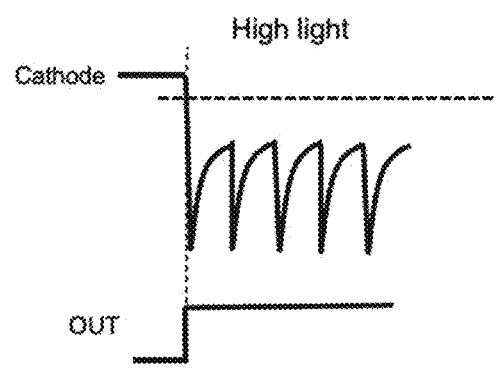
FIG. 1D is a graph showing the cathode voltage of the pixel of FIG. 1A during operation in high light conditions.
Figure 2:
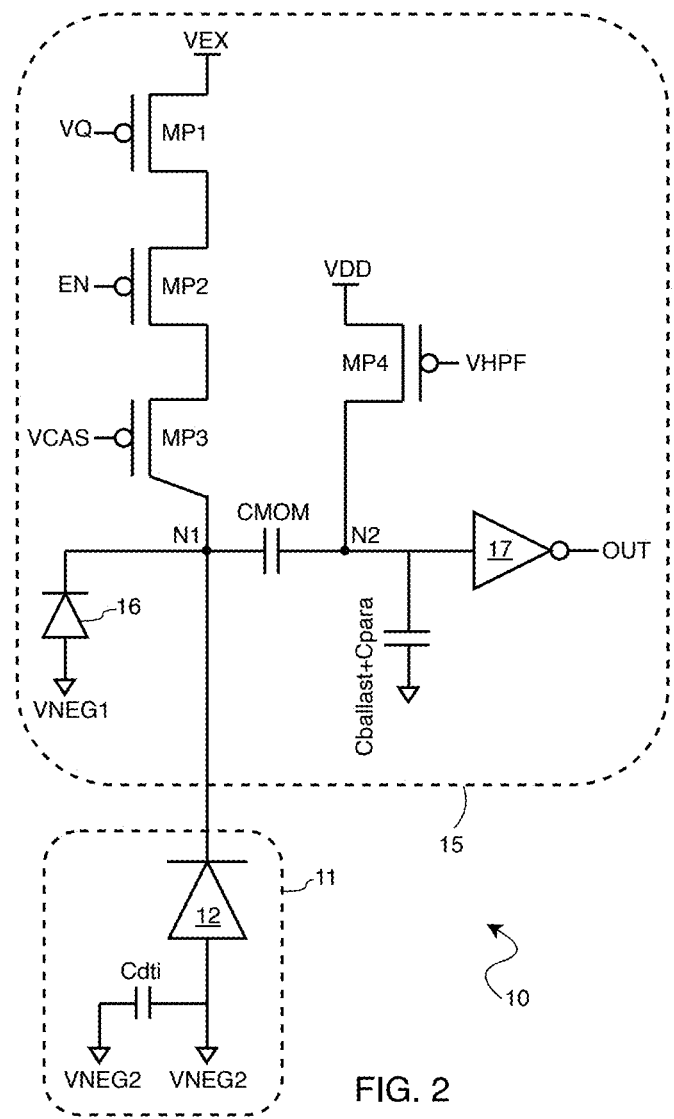
FIG. 2 is a schematic diagram of a SPAD-based detection pixel described herein.

A SPAD pixel 10 is now described with reference to FIG. 2. The SPAD pixel 10 is formed in a stacked die solution where a bottom tier chip includes the circuitry in box 11 and a top tier chip includes the circuitry in box 15.

The top tier chip 11 includes a SPAD 12 having its cathode connected to node N1 and its anode connected to a negative voltage VNEG2 through a deep trench isolation parasitic capacitance Cdti that results from the fact that the SPAD 12 is formed using three dimensional SPAD technology in which different SPADs are separated from one another by deep trench isolations. The negative voltage VNEG2 may be, for example, −24V. The fact that the top tier chip 11 does not include other components other than the SPADs decreases the cost of fabrication and increase fill factor and quantum efficiency.

The bottom tier chip 15 includes a double/thin layer gate oxide (GO1 or GO2) p-channel transistor MP1 having its source connected to a voltage VDD (e.g., 1V), its gate connected to a quench control voltage VQ, and its drain connected to the source of a GO1 or GO2 p-channel transistor MP2. The p-channel transistor MP2 has its drain connected to the source of extended drain GO2 p-channel transistor MP3 and its gate connected to an enable signal EN. The p-channel transistor MP3 has its drain connected to node N1 and its gate connected to a cascode control signal VCAS. Since node N1 represents the electrical connection between top tier chip 11 and bottom tier chip 15, node N1 represents a hybrid bond—a pixel level wafer to wafer electrical connection.

The bottom tier chip 15 further includes a diode 16 having its cathode connected to node N1 and its anode connected to the negative voltage VNEG1, the negative voltage VNEG1 being, for example, −4V. A metal-oxide-metal (MOM) capacitor is connected between nodes N1 and N2. A p-channel double layer gate oxide (GO2) transistor MP4 has its source connected to the voltage VDD, its drain connected to node N2, and its gate connected to a high pass filtering control voltage VHPF.

A ballast capacitor Cballast (also drawn as including the parasitic capacitance Cpara) is connected between node N2 and ground. An output inverter 17 has its input connected to node N2 and provides the output signal OUT at its output. Note that the capacitive voltage divider between capacitors CMOM and Cballast attenuates the voltage at node N2 to be within the safe area of operation of the non-extended drain GO2 transistor MP4.

Figure 2A:
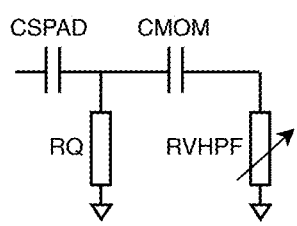
FIG. 2A is a schematic diagram showing the equivalent second order high pass filter formed by the pixel of FIG. 2 during operation.
Figure 2B:
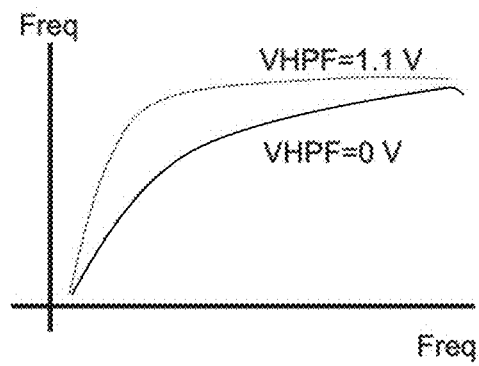
FIG. 2B is a graph showing the transfer function of the high pass filter as it changed in response to changing of the high pass filtering control voltage.

In operation, when an incoming photon strikes the SPAD 12, its cathode voltage will swing between the supply voltage (VDD) and a lower voltage VDD−VEX, creating a current pulse at node N1, shown in FIG. 3A. This voltage conversion of this current pulse is high-pass filtered by a second order filter that is effectively formed by the capacitance of the SPAD (CSPAD), drain to source resistance of transistor MP1 when operating in the linear mode of operation (RQ), capacitance of the capacitor CMOM (CMOM), and the resistance of the transistor MP4 when operating in the linear mode of operation (RVHPF), as shown in FIG. 2A. The transfer function of this second filter may be adjusted by adjusting the high pass filtering control voltage VHPF, as shown in FIG. 2B.

The effect of the filtering applied to the voltage pulse at N1 can be observed in FIG. 3B, which illustrates the voltage pulse at N2 after filtering. Observe that the high frequency components remain, but the DC component has been filtered out, as have the low-frequency components, sharpening the pulse, reducing the pulse width at node N2. In addition to participating in the filtering, the transistor MP3 pulls node N2 upward to a defined voltage, for example to 1V. The combined effect of the filtering and level shifting can be observed in FIG. 4, where the pulse with of pulses at node N2 is reduced and where successive fast pulses still cross above the threshold voltage Vth of the inverter 17, enabling the generation of output pulses OUT which can then be counted.

Figure 5:
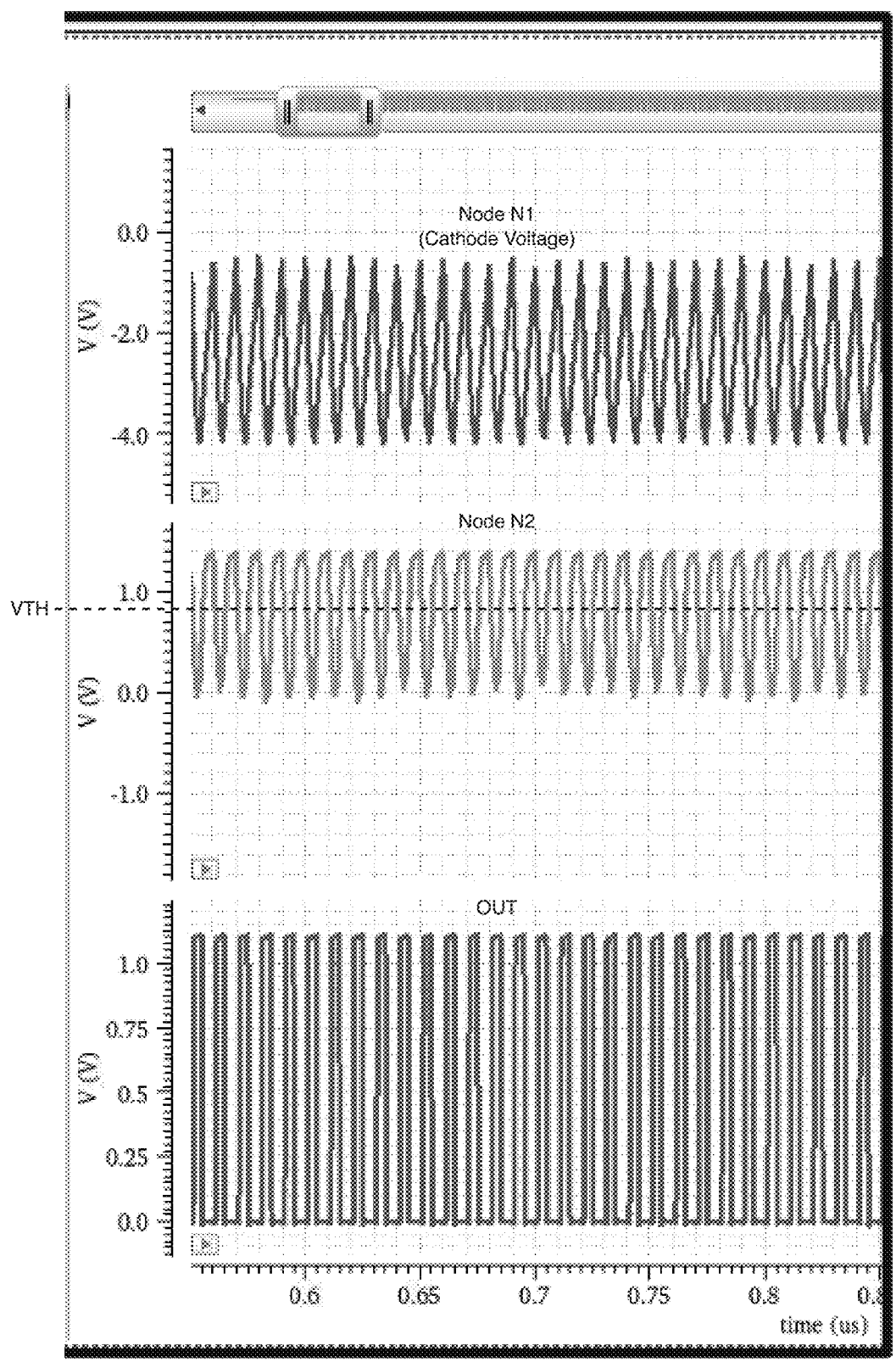
FIG. 5 is a graph showing the voltages at node N1 (the cathode voltage prior to filtering), N2 (the cathode voltage after filtering) as compared to the output of the output inverter during operation in a high light condition.

The effect of the filtering and level shifting during operation can be seen in perhaps greater detail in the graphs of FIG. 5, showing operation in a high light environment. Observe that the cathode voltage at node N1 swings at high frequency, with the pulses failing to reach the threshold voltage Vth of the inverter 15, and the pulses nearly begin to merge. After filtering and level shifting, however, the pulses at node N2 rise more sharply and in fact do rise above the threshold voltage Vth of the inverter 15, enabling the generation of the output pulses OUT which can then be counted.

Therefore, the pixel design 10 described above permits the detection of high count rates in high light environments. This pixel design 10 may be used in a pixel array for use in ranging devices, such as light detection and ranging (LIDAR) and time-of-flight (TOF), which are often incorporated within portable electronic devices. As such, portable electronic devices utilizing numerous instances of the pixel 10 described herein are within the scope of this disclosure.

Finally, it is clear that modifications and variations may be made to what has been described and illustrated herein, without thereby departing from the scope of this disclosure, as defined in the annexed claims.

While the disclosure has been described with respect to a limited number of embodiments, those skilled in the art, having benefit of this disclosure, will appreciate that other embodiments can be envisioned that do not depart from the scope of the disclosure as disclosed herein. Accordingly, the scope of the disclosure shall be limited only by the attached claims.

The invention claimed is:

1. An array of single photon avalanche diodes (SPADs), comprising:
a plurality of pixels, each pixel comprising:
a SPAD having a cathode connected to a first intermediate node and an anode coupled to a first negative voltage at least through a deep trench isolation parasitic capacitance;
a transistor circuit comprising:
a quench transistor connected between a high voltage node and a first transistor circuit node, the quench transistor controlled by a quench control signal;
an enable transistor connected between the first transistor circuit node and a second transistor circuit node, the enable transistor controlled by an enable signal; and
a cascode transistor connected between the second transistor circuit node and the first intermediate node, the cascode transistor controlled by a cascode control signal;
an AC coupling element connected between the first intermediate node and a second intermediate node;
a variable filter component connected between the high voltage node and the second intermediate node;
a ballast capacitor connected between the second intermediate node and ground; and
an inverter having its input connected to the second intermediate node and its output providing an output signal.

2. The array of SPADs of claim 1, wherein the cascode transistor is an extended drain p-channel transistor having its source connected to the second transistor circuit node, its drain connected to the first intermediate node, and its gate controlled by the cascode control signal.

3. The array of SPADs of claim 1, wherein the enable transistor is a thin/double layer gate oxide p-channel transistor having its source connected to the first transistor circuit node, its drain connected to the second transistor circuit node, and its gate controlled by the enable signal.

4. The array of SPADs of claim 1, wherein the quench transistor is a p-channel transistor having its source connected to the high voltage node, its drain connected to the first transistor circuit node, and its gate controlled by the quench control signal.

5. The array of SPADs of claim 1, wherein the variable filter component comprises a double layer gate oxide p-channel transistor having its source connected to the high voltage node, its drain connected to the second intermediate node, and its gate connected to a high pass filter control signal.

6. The array of SPADs of claim 1, wherein the AC coupling element comprises a metal-oxide-metal capacitor.

7. The array of SPADs of claim 1, wherein the transistor circuit, AC coupling element, variable filter component, ballast capacitor, and inverter are integrated within a lower tier chip; wherein the SPAD is integrated within a top tier chip; and wherein the top tier chip and lower tier chip are in a stacked die arrangement.

8. The array of SPADs of claim 1, further comprising a turn-off diode having its anode connected to a second negative voltage lower than the first negative voltage and its cathode connected to the first intermediate node.

9. An array of single photon avalanche diodes (SPADs), comprising:
a plurality of pixels, each pixel comprising:
a SPAD having a cathode connected to a first intermediate node and an anode coupled to a first negative voltage;
a quench circuit connected between the first intermediate node and a high voltage node, the quench circuit includes a thin/double layer gate oxide p-channel transistor having its source connected to a first transistor circuit node, its drain connected to a second transistor circuit node, and its gate controlled by an enable signal;
an AC coupling element connected between the first intermediate node and a second intermediate node;
a filter component connected between the high voltage node and the second intermediate node; and
an inverter having its input connected to the second intermediate node and its output providing an output signal; and
wherein a resistance associated with the quench circuit, a capacitance associated with the SPAD, a capacitance associated with the AC coupling element, and a resistance associated with the filter component form a variable second order filter.

10. The array of SPADs of claim 9, wherein the quench circuit includes a p-channel transistor having its source connected to the high voltage node, its drain connected to a first transistor circuit node, and its gate controlled by a quench control signal.

11. The array of SPADs of claim 9, wherein the AC coupling element comprises a metal-oxide-metal capacitor.

12. The array of SPADs of claim 9, wherein the quench circuit, AC coupling element, filter component, and inverter are integrated within a lower tier chip; wherein the SPAD is integrated within a top tier chip; and wherein the top tier chip and lower tier chip are in a stacked die arrangement.

13. The array of SPADs of claim 9, further comprising a turn-off diode having its anode connected to a second negative voltage lower than the first negative voltage and its cathode connected to the first intermediate node.

14. An array of single photon avalanche diodes (SPADs), comprising:
a plurality of pixels, each pixel comprising:
a SPAD having a cathode connected to a first intermediate node and an anode coupled to first negative voltage;
a quench circuit connected between the first intermediate node and a high voltage node, wherein the quench circuit further includes an extended drain p-channel transistor having its source connected to a second transistor circuit node, its drain connected to the first intermediate node, and its gate controlled by a cascode control signal;

an AC coupling element connected between the first intermediate node and a second intermediate node;

a filter component connected between the high voltage node and the second intermediate node; and an inverter having its input connected to the second intermediate node and its output providing an output signal; and wherein a resistance associated with the quench circuit, a capacitance associated with the SPAD, a capacitance associated with the AC coupling element, and a resistance associated with the filter component form a variable second order filter.

15. The array of SPADs of claim 14, wherein the AC coupling element comprises a metal-oxide-metal capacitor.

16. The array of SPADs of claim 14, wherein the quench circuit, AC coupling element, filter component, and inverter are integrated within a lower tier chip; wherein the SPAD is integrated within a top tier chip; and wherein the top tier chip and lower tier chip are in a stacked die arrangement.

17. The array of SPADs of claim 14, further comprising a turn-off diode having its anode connected to a second negative voltage lower than the first negative voltage and its cathode connected to the first intermediate node.

18. An array of single photon avalanche diodes (SPADs), comprising:

a plurality of pixels, each pixel comprising:

a SPAD having a cathode connected to a first intermediate node and an anode coupled to first negative voltage;

a quench circuit connected between the first intermediate node and a high voltage node;

an AC coupling element connected between the first intermediate node and a second intermediate node;

a filter component connected between the high voltage node and the second intermediate node, wherein the filter component comprises an extended drain double layer gate oxide p-channel transistor having its source connected to the high voltage node, its drain connected to the second intermediate node, and its gate connected to a high pass filter control signal; and an inverter having its input connected to the second intermediate node and its output providing an output signal; and wherein a resistance associated with the quench circuit, a capacitance associated with the SPAD, a capacitance associated with the AC coupling element, and a resistance associated with the filter component form a variable second order filter.

19. The array of SPADs of claim 18, wherein the AC coupling element comprises a metal-oxide-metal capacitor.

20. The array of SPADs of claim 18, wherein the quench circuit, AC coupling element, filter component, and inverter are integrated within a lower tier chip; wherein the SPAD is integrated within a top tier chip; and wherein the top tier chip and lower tier chip are in a stacked die arrangement.

21. The array of SPADs of claim 18, further comprising a turn-off diode having its anode connected to a second negative voltage lower than the first negative voltage and its cathode connected to the first intermediate node.

22. An array of single photon avalanche diodes (SPADs), comprising:

a plurality of pixels, each pixel comprising:

a SPAD having a cathode connected to a first intermediate node and an anode coupled to first negative voltage at least through a deep trench isolation parasitic capacitance;

a quench circuit connected between a high voltage node and the first intermediate node;

an AC coupling element connected between the first intermediate node and a second intermediate node;

a variable filter component connected between the high voltage node and the second intermediate node;

a ballast capacitor connected between the second intermediate node and ground; and an inverter having its input connected to the second intermediate node and its output providing an output signal.

23. The array of SPADs of claim 22, wherein the AC coupling element comprises a metal-oxide-metal capacitor.

24. The array of SPADs of claim 22, wherein the quench circuit, AC coupling element, filter component, ballast capacitor, and inverter are integrated within a lower tier chip; wherein the SPAD is integrated within a top tier chip; and wherein the top tier chip and lower tier chip are in a stacked die arrangement.

25. The array of SPADs of claim 22, further comprising a turn-off diode having its anode connected to a second negative voltage lower than the first negative voltage and its cathode connected to the first intermediate node.

* * * * *